Figure 1:
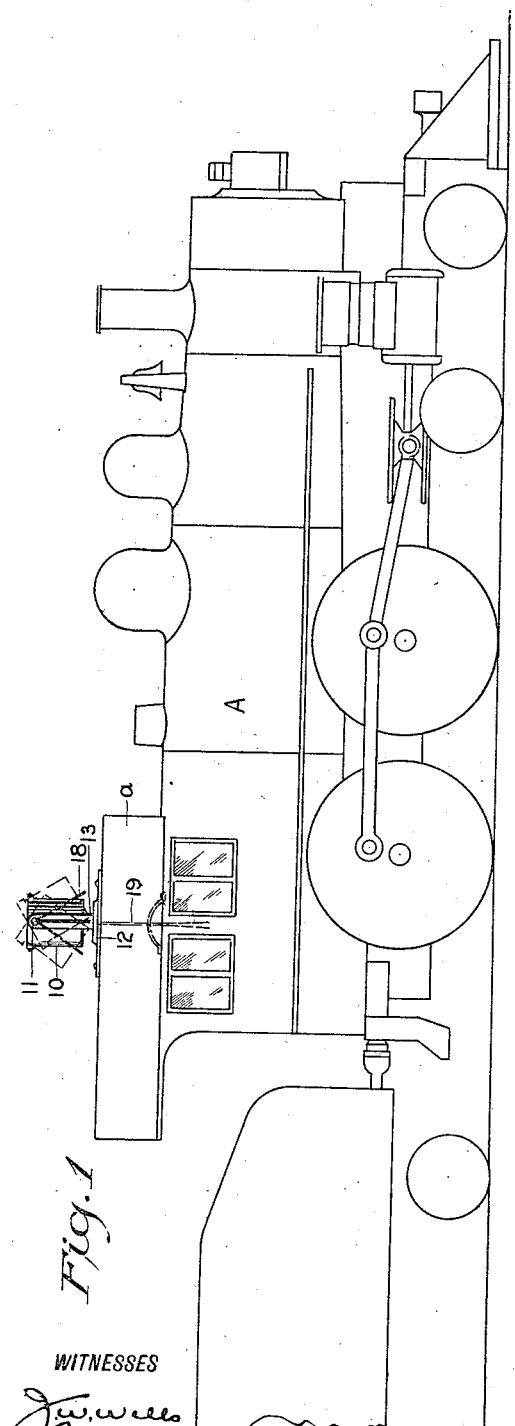

J. H. McPARTLAND.
SEARCH LIGHT ATTACHMENT FOR LOCOMOTIVES.
APPLICATION FILED DEC. 22, 1915.

1,182,696.

Patented May 9, 1916.
2 SHEETS—SHEET 1.

WITNESSES

INVENTOR
James H. McPartland
BY
ATTORNEYS

J. H. McPARTLAND.
SEARCH LIGHT ATTACHMENT FOR LOCOMOTIVES.
APPLICATION FILED DEC. 22, 1915.

1,182,696.

Patented May 9, 1916.
2 SHEETS—SHEET 2.

INVENTOR
James H. McPartland
BY
ATTORNEYS

WITNESSES

UNITED STATES PATENT OFFICE.

JAMES HUGH McPARTLAND, OF HOULTON, MAINE.

SEARCH-LIGHT ATTACHMENT FOR LOCOMOTIVES.

1,182,696.   Specification of Letters Patent.   Patented May 9, 1916.

Application filed December 22, 1915. Serial No. 68,190.

*To all whom it may concern:*

Be it known that I, JAMES H. McPARTLAND, a citizen of the United States, and a resident of Houlton, in the county of Aroostook and State of Maine, have invented a new and Improved Search-Light Attachment for Locomotives, of which the following is a full, clear, and exact description.

The prime object of my invention is to provide a means for use on locomotives, railway cars, street cars, or the like, whereby to indicate at a distance the approach of a train or car as well as its direction of travel.

The purpose of my invention is served by a search-light preferably placed on top of the locomotive or car, and provided with means whereby the light will be automatically tilted to direct the light rays upwardly at an angle corresponding with the direction of travel of the locomotive or car, and vertically when the locomotive or car is standing still, whereby, at night, accidents at crossings and collisions between trains or cars will be minimized. In addition to the automatic tilting of the light, I provide also for a manual control of the light to tilt the same.

The invention in its different phases and the preferred structural embodiment will be particularly explained in the specific description following.

Reference is to be had to the accompanying drawings forming a part of this specification in which similar reference characters indicate corresponding parts in all the views.

Figure 2:
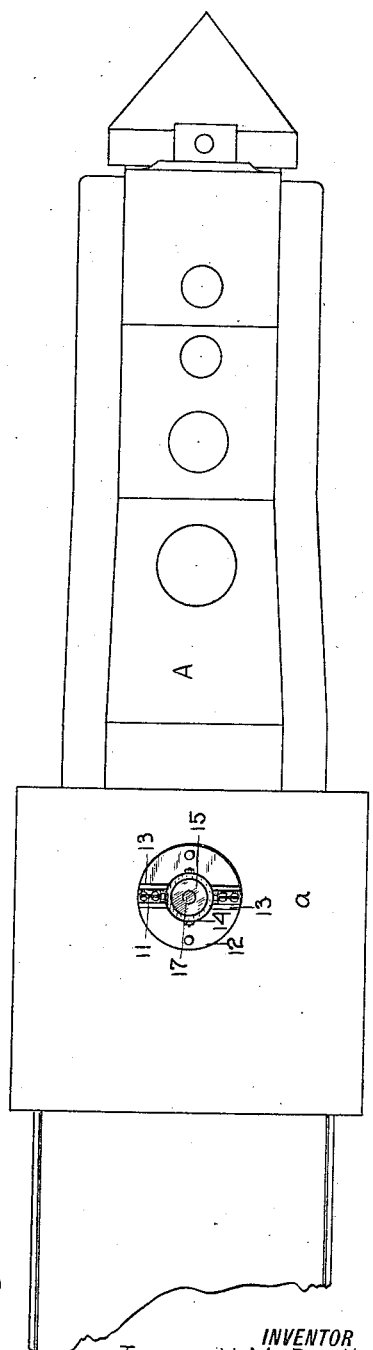
Figure 3:
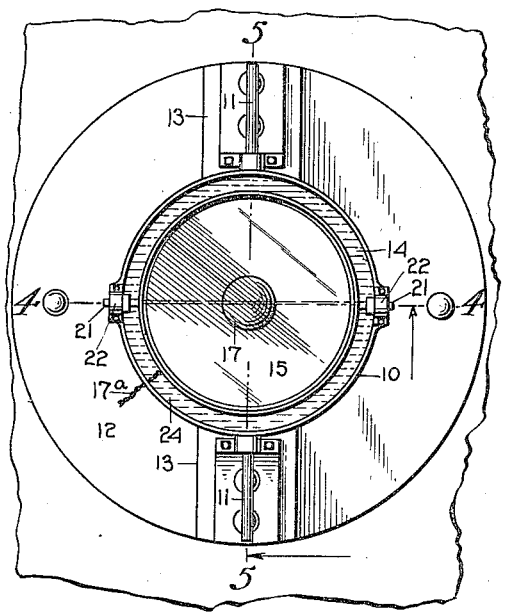
Figure 5:
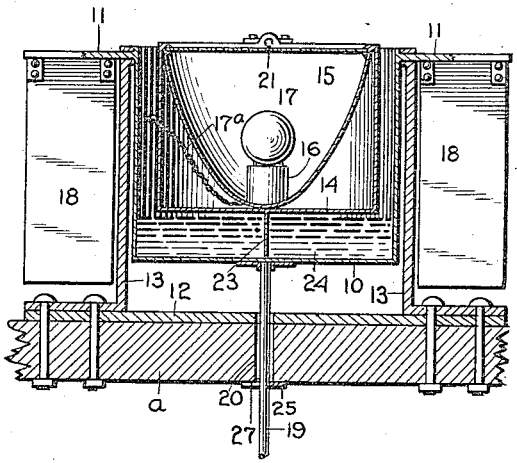
Figure 4:
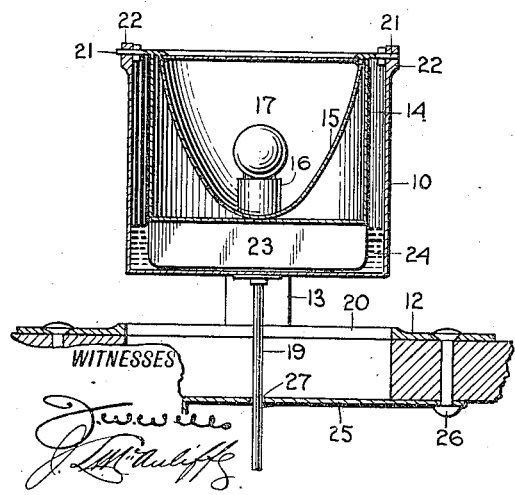
Figure 6:
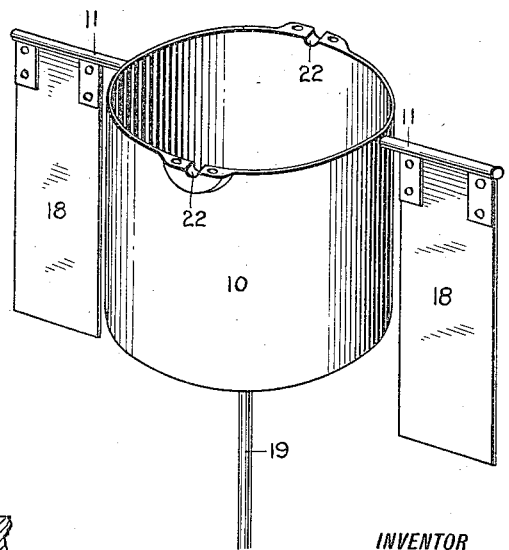

Figure 1 is a side elevation showing diagrammatically a locomotive equipped with my improved search light; Fig. 2 is a plan view thereof; Fig. 3 is an enlarged plan view of the search light; Fig. 4 is a transverse vertical section on the line 4—4, Fig. 3; Fig. 5 is a transverse vertical section on the line 5—5, Fig. 3; and Fig. 6 is a perspective view of the lamp holder.

In the illustrated example of my invention, the search light includes a lamp holder 10 which is mounted on the roof of the cab *a* of a locomotive A. The illustrated means for mounting the lamp holder consists of a base plate 12 secured to the cab roof and side brackets 13 suitably secured thereto and forming bearings at their upper ends for trunnions 11 on the upper end of the lamp holder 10. The lamp holder is cup-shaped and may be cylindrical. Within the holder 10 is a lamp 14 which may consist of a cup-shaped body having a suitable reflector 15 therein and provided with a suitable source of light, here shown as an electric lamp 17 received in a socket 16, connected with conductors 17ª leading from any convenient source of electricity.

In order to cause the search light to be automatically tilted, in the direction in which the vehicle is traveling, I provide on the trunnions 11, of the holder 10, depending vanes 18 at opposite sides so that the resistance of the air, when the vehicle is in motion, will move the vanes 18 rearwardly thereby rocking the search light 11 and tilting the same in the direction of travel. Thus, not only will the light rays be visible at a long distance from the vehicle but the direction of travel of the vehicle will be indicated whereby to signal persons at crossings and the engineers or drivers of another vehicle on the track.

Should the vehicle be backed, the reverse movements of the vanes 18 will give a corresponding tilt to the search light. On the other hand, when the vehicle is not in motion the light rays will be directed vertically, thus indicating clearly that the vehicle is not traveling.

In order to provide for the tilting of the search light by the engineer or the driver, I provide suitable manually-operated means connected with the holder 10, for which purpose a rod 19, or other means, may be secured to said lamp holder and extend downward through a slot 20 in the roof-cab *a* or the like.

I provide also for the lateral tilting of the lamp 14 in the holder 10, that is to say, a tilting transversely to the direction of travel; the means for this purpose may consist of trunnions 21 on the lamp 14 and rockable in bearings 22 on the lamp holder 10. To retard the rocking of the lamp 14 with a view of preventing sudden vibrations, I provide retarding means here shown as consisting of a depending flat blade 23 at the under side of the holder 14, said blade being immersed in oil 24, glycerin or other fluid which desirably will be of a non-freezing character.

I wish to state in conclusion that although the illustrated example constitutes a practical embodiment of my invention, I do not limit myself strictly to the mechanical details herein illustrated, since manifestly the same can be considerably varied without departure from the spirit of the invention as defined in the appended claims.

To prevent movement of the rod 19 in the slot 20, a suitable lock or latch may be employed. In Figs. 4 and 5 there is shown a swinging latch plate 25 pivoted at one end as at 26 to the roof of the cab *a* and formed with a lateral notch 27 to receive the rod 19.

Having thus described my invention I claim as new and desire to secure by Letters Patent:

1. In a search light, a holder adapted to carry light-producing means, means to rockably support the holder on a vehicle to travel therewith, and tilting means subject to air resistance offered thereto by a forward movement of the vehicle, said holder being movable by a movement of said last-mentioned means to tilt the said holder.

2. In a search light, a holder adapted to receive light-producing means, means to rockably support the same on a vehicle, and a swinging vane subject to air resistance and connected with the said holder to tilt the same by the swinging of the vane.

3. In a search light, a holder having an open top and provided with trunnions, depending vanes on said trunnions subject to air resistance, means to support the holder on a vehicle, said support having bearings for said trunnions to sustain the holder and vanes for swinging movement, and light producing means supported in said holder.

4. In a search light, a holder adapted to carry light-producing means, means to rockably support the holder on a vehicle to travel therewith, a vane connected with the holder and subject to air pressure to cause the swinging of the vane and the tilting of the holder by resistance of the air when the vehicle is traveling, and manually operable means connected with the holder to tilt the same.

5. In a search light, a holder, means to rockably support the holder on a vehicle to travel therewith, said holder being adapted to contain a liquid, a vane connected with the holder adapted to be swung by the resistance of the air when the vehicle travels, a lamp supported in the holder to rock transversely to the direction in which the holder rocks, and a retarding member on the said lamp at the bottom presenting broad surfaces at its opposite sides to retard the rocking of the lamp when the said retarding member is immersed in a liquid in the holder.

In testimony whereof I have signed my name to this specification in the presence of two subscribing witnesses.

JAMES HUGH McPARTLAND.

Witnesses:
LEONARD A. PIERCE,
LENVILLE W. ROBBINS.

Copies of this patent may be obtained for five cents each, by addressing the "Commissioner of Patents, Washington, D. C."